US009661174B2

(12) United States Patent
Terada et al.

(10) Patent No.: US 9,661,174 B2
(45) Date of Patent: May 23, 2017

(54) IMAGE READING APPARATUS THAT ENSURES CONDENSATION REMOVAL AT LOW COST, CONDENSATION REMOVAL METHOD, AND RECORDING MEDIUM

(71) Applicant: Kyocera Document Solutions Inc., Osaka (JP)

(72) Inventors: Tsuyoshi Terada, Osaka (JP); Mari Kokomoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/080,608

(22) Filed: Mar. 25, 2016

(65) Prior Publication Data

US 2016/0286067 A1  Sep. 29, 2016

(30) Foreign Application Priority Data

Mar. 25, 2015  (JP) .................................. 2015-062758

(51) Int. Cl.
*H04N 1/00*  (2006.01)

(52) U.S. Cl.
CPC ..... *H04N 1/00992* (2013.01); *H04N 1/00954* (2013.01); *H04N 2201/0094* (2013.01)

(58) Field of Classification Search
CPC ........... H04N 1/00992; H04N 1/00954; H04N 2201/0094
See application file for complete search history.

(56) References Cited

FOREIGN PATENT DOCUMENTS

| JP | 2002-281201 A | 9/2002 |
|----|---------------|--------|
| JP | 2011029806 A | * 2/2011 |

OTHER PUBLICATIONS

English machin translation of JP 2011029806A.*

* cited by examiner

*Primary Examiner* — Iriana Cruz
(74) *Attorney, Agent, or Firm* — James Judge

(57) ABSTRACT

An image reading apparatus includes an image reading unit, a condensation determination circuit, a condensation removal unit, a time measurement circuit, and a shortest determination circuit. The condensation removal unit executes a condensation removal in accordance with a specific condensation removal pattern among a plurality of condensation removal patterns for heating the condensation occurrence target portion when an occurrence of condensation is determined. The time measurement circuit measures a condensation removal time taken to complete the condensation removal of the specific condensation removal pattern. The shortest determination circuit determines the condensation removal pattern having a shortest of the condensation removal time among the plurality of the condensation removal patterns as a shortest pattern, and causes the condensation removal unit to execute the condensation removal in accordance with the shortest pattern when the condensation determination circuit determines that a condensation occurs after the determination of the shortest pattern.

5 Claims, 5 Drawing Sheets

IMAGE READING APPARATUS THAT ENSURES CONDENSATION REMOVAL AT LOW COST, CONDENSATION REMOVAL METHOD, AND RECORDING MEDIUM

INCORPORATION BY REFERENCE

This application is based upon, and claims the benefit of priority from, corresponding Japanese Patent Application No. 2015-062758 filed in the Japan Patent Office on Mar. 25, 2015, the entire contents of which are incorporated herein by reference.

BACKGROUND

Unless otherwise indicated herein, the description in this section is not prior art to the claims in this application and is not admitted to be prior art by inclusion in this section.

There is provided a technique that employs a dedicated heater to eliminate condensation inside a document reading unit for an image reading apparatus such as a copier and a multi-functional peripheral.

For example, there is proposed an original document reading apparatus in an image forming apparatus that includes: a gain adjustment unit that outputs adjusted data, which is a gain-adjusted analog signal from a photoelectric conversion unit, an reading unit that reads the output adjusted by the gain adjustment unit, and a control unit that determines whether or not condensation occurs from a chronological change of the read adjusted output value, so as to control a condensation-preventing heater based on the determination. This ensures precise detection of the condensation without using a specific unit while reducing energy required for the condensation prevention and a cost of an apparatus.

SUMMARY

An image reading apparatus according to one aspect of the disclosure includes an image reading unit, a condensation determination circuit, a condensation removal unit, a time measurement circuit, and a shortest determination circuit. The image reading unit includes a light source unit, a mirror portion that reflects a light from the light source unit, and a conversion unit that converts the reflected light into data. The condensation determination circuit determines whether a condensation occurs at least one of a plurality of condensation occurrence target portions of the image reading unit or not. The condensation removal unit executes a condensation removal in accordance with a specific condensation removal pattern among a plurality of condensation removal patterns for heating the condensation occurrence target portion when an occurrence of the condensation is determined. The time measurement circuit measures a condensation removal time taken to complete the condensation removal of the specific condensation removal pattern. The shortest determination circuit determines the condensation removal pattern having a shortest of the condensation removal time among the plurality of the condensation removal patterns as a shortest pattern, and causes the condensation removal unit to execute the condensation removal in accordance with the shortest pattern when the condensation determination circuit determines that a condensation occurs after the determination of the shortest pattern.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
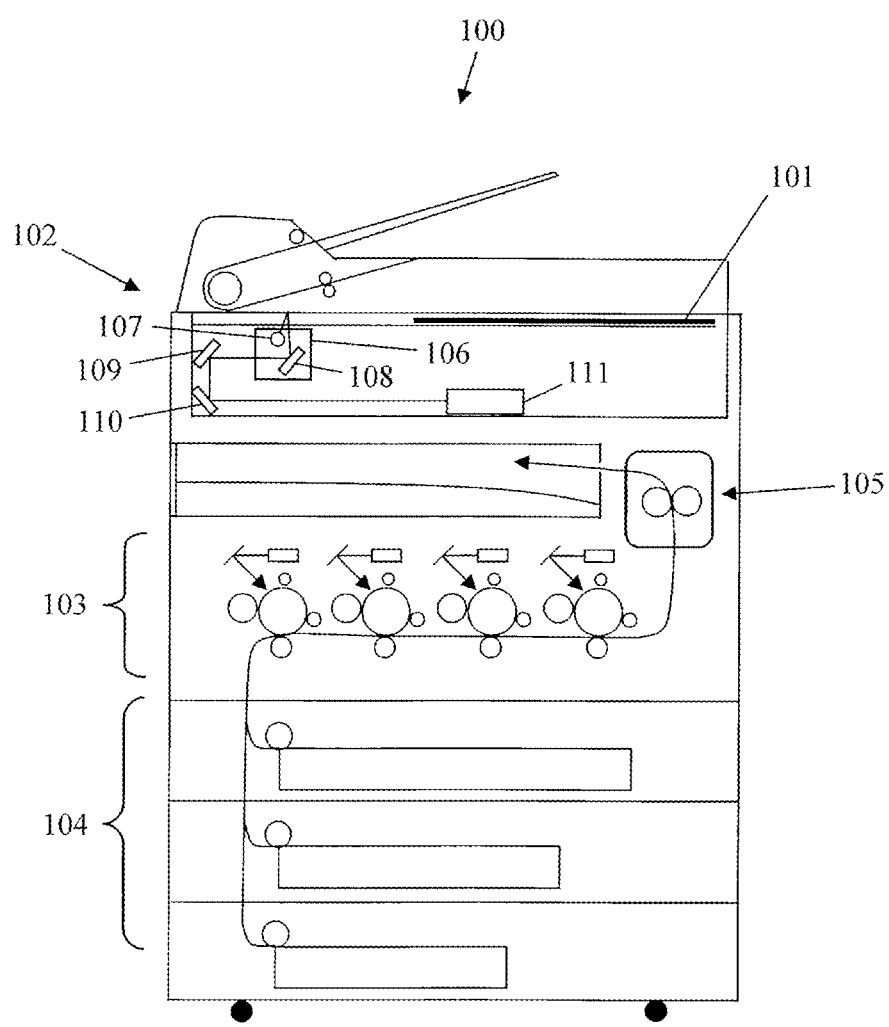
FIG. 1 conceptually illustrates an overall configuration inside an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of an image reading apparatus and a condensation removal method of the disclosure for ease of understanding the disclosure, with reference to the attached drawings. The following embodiment is merely an exemplary embodiment according to the disclosure and not intended to limit the technical scope of the disclosure. Additionally, an alphabet S attached before a numeral in the flowchart mean a step.

The following describes an image forming apparatus that includes a typical image reading apparatus as one example of the embodiment of the disclosure. A multi-functional peripheral (MFP) that includes functions such as a copying, a facsimile, a scanner, and a printer corresponds to the image forming apparatus of the disclosure.

After accepting a setting condition of a specific job from a user, an image forming apparatus 100 drives respective units (such as an image reading unit 102, an image forming unit 103, a paper sheet conveyor 104, and a fixing unit 105) via an operation unit 101 to provide this job as illustrated in FIG. 1. The job is, for example, a copy job, a facsimile transmission job, a scan job, a printer job.

The image reading unit 102 includes a running body 106 (carriage) located at an inferior surface of a platen. This running body 106 internally includes a light source unit 107 and a first mirror portion 108. The light source unit 107 irradiates an original document placed on the platen with a light. The first mirror portion 108 reflects the light reflected from this original document outside the running body 106.

The light reflected by the first mirror portion 108 is guided to a conversion unit 111 (for example, a CCD) via a second mirror portion 109 and a third mirror portion 110, which are located outside the running body 106. The conversion unit 111 is located outside the running body 106 and converts the light to image data of the original document. The image reading unit 102 causes the running body 106 to run from one end portion to the other end portion at the inferior surface of the platen to read all the image data of the original document.

The image forming unit 103 forms a toner image based on the read image data to transfer this toner image onto a paper sheet conveyed from the paper sheet conveyor 104. The fixing unit 105 is heated from a normal temperature to a predetermined fixing temperature to fixes the toner image transferred on the paper sheet at this fixing temperature, thus producing a printed matter. This printed matter is discharged to a sheet discharge tray. The fixing unit 105 is located under a part of position where a running by the running body 106 of the image reading unit 102 runs.

A control circuit (not illustrated) in the image forming apparatus 100 connects to a central processing unit (CPU), a read only memory (ROM), a random access memory (RAM), a hard disk drive (HDD), a solid state drive (SSD), and drivers corresponding to respective driving units via an internal bus.

The CPU in the image forming apparatus 100, for example, uses the RAM as a work area to execute programs stored in, for example, the ROM, the HDD, and the SSD. Then, the CPU transmits and receives, for example, data, instructions, signals, and commands to/from the drivers based on these execution results to control operations of the respective driving unit regarding execution of a print job. In regard to respective units (illustrated in FIG. 2) described later other than the driving units, the CPU ensures these respective units by execution of respective programs. The ROM, the RAM, the HDD, the SSD, or similar device store the programs and data that ensure the respective units described the following.

Figure 2:
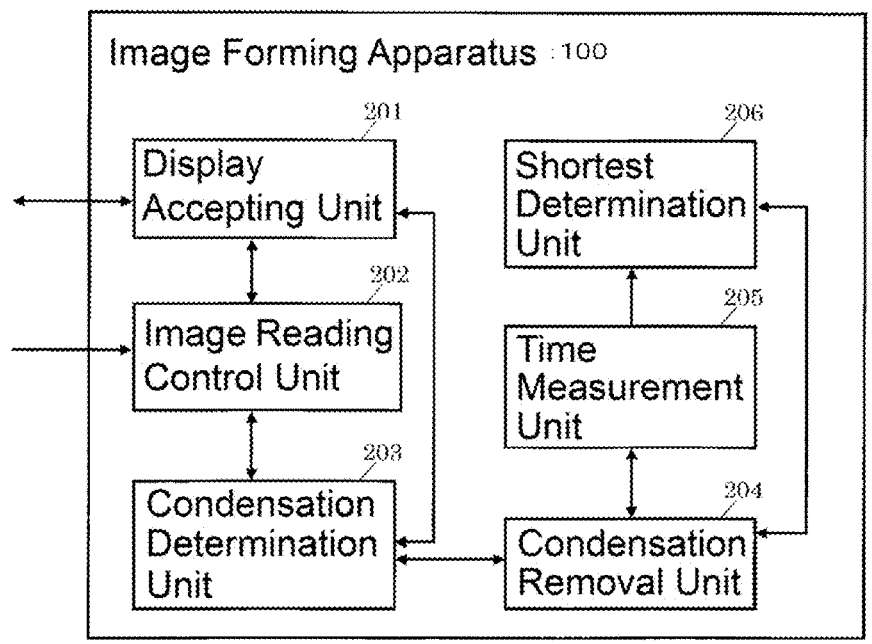
FIG. 2 illustrates a functional block of the image forming apparatus according to the one embodiment.
Figure 3:
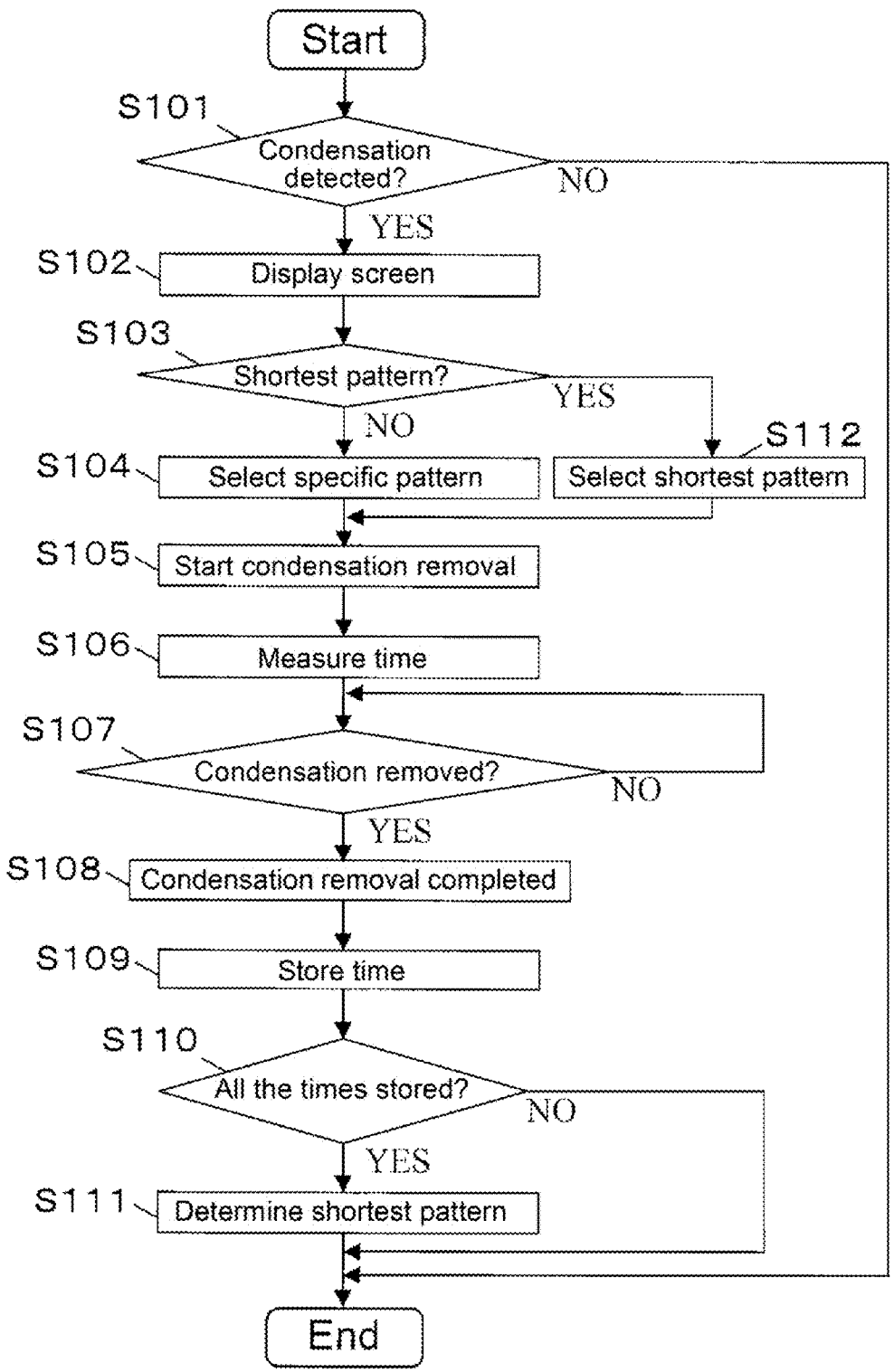
FIG. 3 illustrates an execution procedure of the one embodiment.

Next, with reference to FIGS. 2 and 3, the following describes a configuration and an execution procedure according to the embodiment of the disclosure. First, when the user turns on a power supply of the image forming apparatus 100, a display accepting unit 201 in this image forming apparatus 100 is activated, and then accepts the setting condition of the job from the user.

After turning on the power supply of the image forming apparatus 100, an image reading control unit 202 executes a calibration process for an image reading. The calibration process includes, for example, a process of a shading correction. The image reading control unit 202 causes the light source unit 107 of the running body 106 in the image reading unit 102 to move to a position where a white plate (not illustrated) is preliminarily set. This light source unit 107 irradiates the white plate with the light. The light reflected from this white plate is guided to the conversion unit 111 via the first mirror portion 108, the second mirror portion 109, and the third mirror portion 110. Thus, the image reading control unit 202 obtains image data corresponding to the reflected light from this white plate. The conversion unit 111 is, for example, a CCD, which is a one-dimensional image sensor and includes a light receiving surface, which is constituted of a plurality of light receiving elements arranged in a line shape in the main-scanning direction. The conversion unit 111 photoelectrically converts the reflected light for one line of the main-scanning direction of the original document, which is condensed on this light receiving surface, using these plurality of the light receiving elements to output image data for one line of the main-scanning direction. This image data is constituted of a value indicating brightness of the reflected light corresponding to these respective plurality of the light receiving elements (pixel values). The image reading control unit 202 executes a process of the shading correction using the image data corresponding to the reflected light from the white plate.

Here, when the image reading control unit 202 executes the process of the shading correction, the image reading control unit 202 notifies a condensation determination unit 203 (also referred to as a condensation determination circuit) of its execution. The condensation determination unit 203, which has received this notification, determines whether or not condensation occurs at a plurality of condensation occurrence target portions (FIG. 3: S101).

Here, the condensation occurrence target portion is a portion where condensation possibly occurs according to a change in an environmental temperature or environment humidity. For example, the condensation occurrence target portions of the embodiment of the disclosure include the first mirror portion 108, the second mirror portion 109, the third mirror portion 110, and the conversion unit 111. Condensation occurs at any of these.

Additionally, in the disclosure, a known method may be employed as a determination method whether or not condensation occurs. For example, the condensation determination unit 203 uses image data corresponding to the reflected light from the white plate. When a condensation occurs on any surface of the first mirror portion 108, the second mirror portion 109, the third mirror portion 110, or the conversion unit 111, a diffused reflection of the light occurs at the portion where the condensation occurs. This increases a luminescence level that enters the conversion unit 111. Consequently, this obtained image data is brighter than an obtained image data when the condensation does not occur. Thus, the condensation determination unit 203 determines whether or not the pixel values of the image data corresponding to the reflected light from the white plate exceed the reference pixel value for condensation determination. The pixel value of the image data may be, for example, an average value of the pixel values of the image data for one line of the main-scanning direction or pixel values at a specific position. When the pixel values of the image data corresponding to the reflected light from the white plate exceed the reference pixel value, the condensation determination unit 203 determines that the condensation occurs. When the pixel values of the image data corresponding to the reflected light from the white plate is equal to or less than the reference pixel value, the condensation determination unit 203 determines that the condensation does not occur.

As the result of the determination, when determining that the condensation does not occur (FIG. 3: NO at S101), the condensation determination unit 203 completes a process of the determination. In this case, when the image reading control unit reads an image of the original document, the image reading control unit 202 normally reads the image. Thus, the image reading control unit 202 completes the calibration process, and the display accepting unit 201 accepts the setting condition of the job.

On the other hand, as the result of the determination, when the condensation determination unit 203 determines that the condensation occurs (FIG. 3: YES at S101), the condensation determination unit 203 notifies the display accepting unit 201 and a condensation removal unit 204 of its result. The display accepting unit 201, which has received this notification, consequently displays a condensation-removal in progress screen 400 on a touch panel of the operation unit 101 (FIG. 3: S102).

Figure 4A:
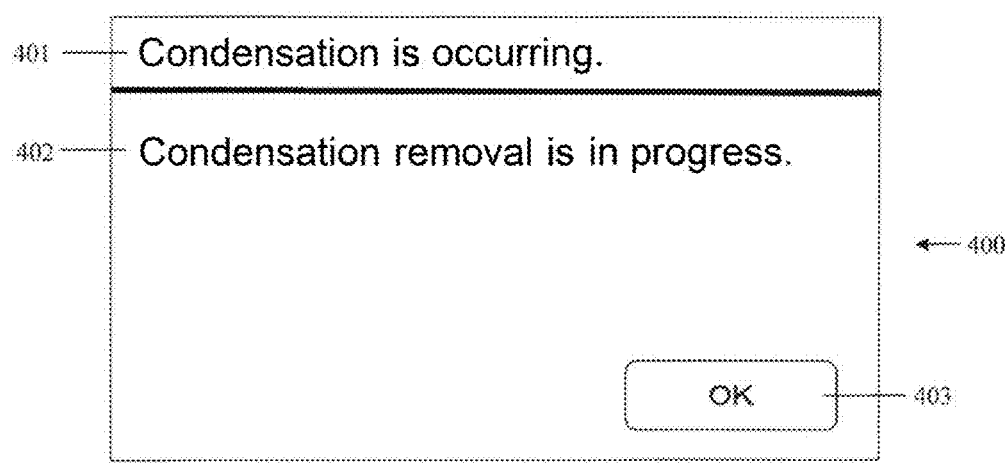
FIG. 4A illustrates an exemplary condensation-removal in progress screen according to the one embodiment.

As illustrated in FIG. 4A, the condensation-removal in progress screen 400 displays a message 401 indicating a fact that condensation occurs, a message 402 indicating "Condensation removal is in progress," and an OK key 403. This allows the user to know that the condensation has occurred.

Then, the condensation removal unit 204, which has received the notification, executes a condensation removal in a specific condensation removal pattern among a plurality of condensation removal patterns that heats any of the first mirror portion 108, the second mirror portion 109, the third mirror portion 110, or the conversion unit 111.

Here, as illustrated in FIG. 1, the first mirror portion 108 is located inside the running body 106, the second mirror portion 109 and the third mirror portion 110 are located on a side surface inside a housing, which houses the running body 106, and the conversion unit 111 is located on a bottom surface inside the housing. In this case, the position where the condensation occurs is likely to correspond to any of the first mirror portion 108 inside the running body 106, the second mirror portion 109, the third mirror portion 110, or the conversion unit 111, which are outside the running body 106. As described above, the condensation occurrence is determined from the luminescence level that enters the conversion unit 111. This makes it difficult to identify where the condensation occurs among the first mirror portion 108, the second mirror portion 109, the third mirror portion 110, and the conversion unit 111, which are on the common optical path.

Here, the embodiment of the disclosure defines three condensation removal patterns described later corresponding to location configurations of the plurality of the condensation occurrence target portions, which are the first mirror portion 108, the second mirror portion 109, the third mirror portion 110, and the conversion unit 111.

Figure 4B:
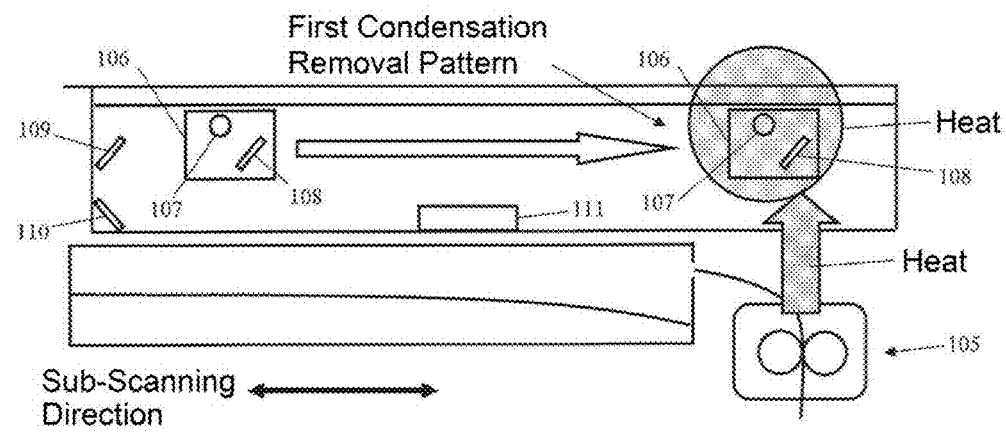
FIG. 4B illustrates an exemplary first condensation removal pattern according to the one embodiment.

A first condensation removal pattern heats the first mirror portion 108 inside the running body 106. As illustrated in FIG. 4B, this running body 106 is moved to a direction (the sub-scanning direction) orthogonal to the main-scanning direction such that the first mirror portion 108 inside the running body 106 is located above the fixing unit 105, then the fixing unit 105 is heated while the light source unit 107 of this running body 106 is lighted. A fixing temperature of the fixing unit 105 is heated to a high temperature (for example, 180 degrees), and then its heat moves upward. This causes the first condensation removal pattern to provide the first mirror portion 108 with the heat of the fixing unit 105. After lighting the light source unit 107 heats it around the light source unit 107 to a high temperature (for example, 30 degrees), this light source unit 107 radially generates heat. This causes the first condensation removal pattern to further provide the first mirror portion 108 with the heat of the light source unit 107.

Figures 5A, 5B:
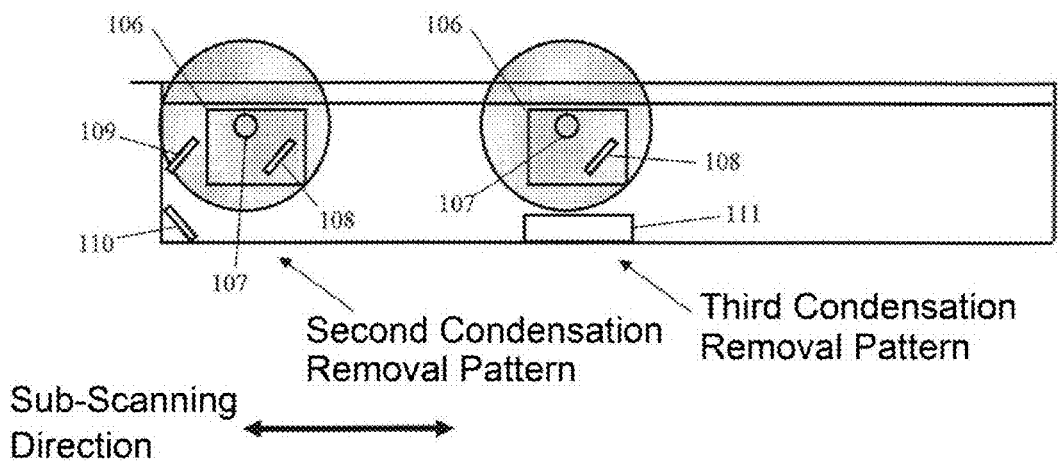
FIG. 5A illustrates exemplary second and third condensation removal patterns according to the one embodiment.
FIG. 5B illustrates an exemplary condensation removal timetable according to the one embodiment.

A second condensation removal pattern heats the second mirror portion 109 and the third mirror portion 110, which are outside the running body 106. As illustrated in FIG. 5A, the second condensation removal pattern causes this running body 106 to move such that the light source unit 107 inside the running body 106 becomes located close to the second mirror portion 109 and the third mirror portion 110, and then the light source unit 107 of this running body 106 is lighted. In the second condensation removal pattern, a radial movement of heat from the light source unit 107 provides the second mirror portion 109 and the third mirror portion 110 with the heat from the light source unit 107.

A third condensation removal pattern heats the conversion unit 111 outside the running body 106. As illustrated in FIG. 5A, the third condensation removal pattern causes this running body 106 to move such that the light source unit 107 inside the running body 106 is located above the conversion unit 111, and then the light source unit 107 of this running body 106 is lighted. In the third condensation removal pattern, a radial movement of heat from the light source unit 107 provides the conversion unit 111 with the heat from the light source unit 107.

The three condensation removal patterns described above is identified by, for example, a condensation removal timetable 500, which is a specific memory. The condensation removal timetable 500 stores, as illustrated in FIG. 5B, a plurality (three) of condensation removal patterns 501 associated with condensation removal times 502 measured by executions of these condensation removal patterns. The three condensation removal patterns 501 are stored, for example, the first condensation removal pattern, the second condensation removal pattern, and the third condensation removal pattern in this order from the upmost stage. None of the times is stored in all the condensation removal times 502 at this time because the condensation removal among the condensation removal patterns has not executed yet.

The condensation removal unit 204 refers to the condensation removal timetable 500 to determine whether the shortest pattern having the shortest time required for the condensation removal is determined or not (FIG. 3: S103).

As a result of the determination, when the shortest pattern has not been determined (FIG. 3: NO at S103), the condensation removal unit 204 selects one condensation removal pattern from the three condensation removal patterns 501 (FIG. 3: S104).

After the condensation removal unit 204 selects the condensation removal pattern, for which the condensation removal time 502 is not stored, for example, the first condensation removal pattern stored in the upmost stage among the three condensation removal patterns 501 of the condensation removal timetable 500, the condensation removal unit 204 starts the condensation removal in accordance with the first condensation removal pattern (FIG. 3: S105).

When the condensation removal unit 204 starts the condensation removal, the condensation removal unit 204 notifies a time measurement unit 205 (also referred to as a time measurement circuit) of its start. The time measurement unit 205, which has received this notification, measures a condensation removal time taken to complete the condensation removal of this first condensation removal pattern (FIG. 3: S106).

For example, the time measurement unit 205 activates a preliminarily located specific timer to measure an elapsed time from the starting time point of the condensation removal in response to the start of the condensation removal of the first condensation removal pattern.

When the condensation removal unit 204 starts the condensation removal, the condensation removal unit 204 also notifies the condensation determination unit 203 of its start. The condensation determination unit 203, which has received this notification, periodically obtains the image data corresponding to the reflected light from the white plate via the image reading control unit 202 to determine whether or not the condensation is removed using the image data corresponding to the reflected light from this white plate (FIG. 3: S107).

Here, when the pixel values of the image data corresponding to the reflected light from the white plate exceed the reference pixel value, the condensation determination unit 203 determines that the condensation is not removed. When the pixel values of the image data corresponding to the reflected light from the white plate is equal to or less than the reference pixel value, the condensation determination unit 203 determines that the condensation is removed.

As a result of the determination, when the condensation determination unit 203 determines that the condensation is not removed (FIG. 3: NO at S107), the condensation determination unit 203 causes the condensation removal unit 204 to continue executing the condensation removal and obtains the image data corresponding to the reflected light from the white plate again to determine whether or not the condensation is removed (FIG. 3: S107).

On the other hand, as a result of the determination, when the condensation determination unit 203 determines that the condensation is removed (FIG. 3: YES at S107), the condensation determination unit 203 notifies the condensation removal unit 204 and the display accepting unit 201 of its result. The condensation removal unit 204, which has received this notification, stops the condensation removal (FIG. 3: S108). The display accepting unit 201, which has received the notification, stops displaying the condensation-removal in progress screen 400 on the touch panel.

After the condensation removal unit 204 stops the condensation removal, the condensation removal unit 204 notifies the time measurement unit 205 of its stop. The time measurement unit 205, which has received this notification, stops the timer and causes the specific memory to store an elapsed time measured by this timer as the condensation removal time taken to complete the condensation removal of the first condensation removal pattern (FIG. 3: S109).

For example, as illustrated in FIG. 5B, the time measurement unit 205 causes the condensation removal time 502 corresponding to the first condensation removal pattern to store the measured condensation removal time (for example, 40 minutes) among the condensation removal patterns 501 of the condensation removal timetable 500.

After the time measurement unit 205 completes the storage of the condensation removal, the time measurement unit 205 notifies a shortest determination unit 206 (also referred to as a shortest determination circuit) of its completion. The shortest determination unit 206, which has received this notification, determines the shortest pattern from the three condensation removal patterns 501.

For example, the shortest determination unit 206 refers to the condensation removal timetable 500 to determine whether or not the respective condensation removal times 502 are stored for all the condensation removal patterns 501 of this condensation removal timetable 500 (FIG. 3: S110).

As a result of the determination, when all the condensation removal times 502 are not stored (FIG. 3: NO at S110), this prevents the shortest determination unit 206 from determining the shortest pattern. Thus, the shortest determination unit 206 terminates the process that determines the shortest pattern.

In this case, in S101, when the condensation determination unit 203 determines that condensation occurs again (FIG. 3: YES at S101), the condensation removal unit 204 selects, for example, the second condensation removal pattern, which is a condensation removal pattern that does not store the condensation removal time 502 (FIG. 3: S104), to start the condensation removal in accordance with this second condensation removal pattern (FIG. 3: S105) because the shortest pattern is not determined (FIG. 3: NO at S103). As described above, after the condensation occurs, a condensation removal in accordance with the condensation removal pattern that does not store the condensation removal time 502 is sequentially executed. This consequently causes all the condensation removal times 502 to be stored.

Then, in S110, when all the condensation removal times 502 are stored (FIG. 3: YES at S110), the shortest determination unit 206 determines a condensation removal pattern having the shortest condensation removal time, among all the condensation removal times 502, as the shortest pattern (FIG. 3: S111). For example, as illustrated in FIG. 5B, when the condensation removal timetable 500 stores the condensation removal time of the first condensation removal pattern of 40 minutes, the condensation removal time of the second condensation removal pattern of 50 minutes, and the condensation removal time of the third condensation removal pattern of 60 minutes, the first condensation removal pattern is determined as the shortest pattern.

Then, when the next condensation removal is executed, the shortest determination unit 206 causes the condensation removal unit 204 to execute the condensation removal of the shortest pattern. That is, in S101, when it is determined that a condensation occurs again (FIG. 3: YES at S101), since the shortest pattern is determined (FIG. 3: YES at S103), the condensation removal unit 204 selects the determined shortest pattern (for example, the first condensation removal pattern) (FIG. 3: S112) to start the condensation removal in accordance with this shortest pattern (FIG. 3: S105).

Thus, the shortest pattern is regarded as the most effective pattern for the condensation removal, and then it is determined to be the shortest pattern. After that, execution of the condensation removal in accordance with this shortest pattern ensures the efficiency improved condensation removal while achieving a waiting time shorten of the user. Additionally, as described above, the execution of the condensation removal in accordance with the shortest pattern ensures the reduced consumption energy and the enhanced cost performance even using heat of the fixing unit 105 and the light source unit 107.

Incidentally, in the embodiment of the disclosure, even after the condensation removal starts in accordance with the shortest pattern, the time measurement unit 205 measures the condensation removal time taken to complete the condensation removal of the shortest pattern (FIG. 3: S106), and stores (updates) the measured condensation removal time (for example, 55 minutes) again as the condensation removal time 502 corresponding to the shortest pattern of the condensation removal timetable 500 (the first condensation removal pattern), as illustrated in FIG. 5B (FIG. 3: S109). Then, the shortest determination unit 206 redetermines a condensation removal pattern having the shortest condensation removal time among the three condensation removal patterns 501 as the shortest pattern after the condensation removal time of the shortest pattern is updated (FIG. 3: S111). Thus, for example, when the condensation removal time of the shortest pattern (the first condensation removal pattern) is longer than the second shortest condensation removal time (for example, the condensation removal time of the second condensation removal pattern), reviewing the shortest pattern ensures execution of the constantly efficient condensation removal.

Especially, a condensation occurrence portion and a condensation occurrence season (for example, summer and winter) significantly vary according to the kind of an installation region of the image forming apparatus 100 (for example, subtropical regions and cold regions). However, constantly reviewing the shortest pattern ensures the efficiency maintained condensation removal.

Here, the redetermination method of the shortest pattern is not especially limited. For example, when the time measurement unit 205 updates the condensation removal time of the shortest pattern, the shortest determination unit 206 determines whether or not the condensation removal time of the shortest pattern after the update is longer than a condensation removal time determined to be the next (which is the second) shortest among the condensation removal times of the other condensation removal patterns other than the shortest pattern. Then, as a result of the determination, when the condensation removal time of the shortest pattern is shorter than the next shortest condensation removal time, the shortest determination unit 206 determines the shortest pattern as it is. When the condensation removal time of the shortest pattern is longer than the next shortest condensation removal time, the shortest determination unit 206 causes the condensation removal unit 204 to execute the condensation removals in accordance with the other condensation removal patterns and causes the time measurement unit 205 to remeasure the condensation removal times of the other condensation removal patterns. Then, after all the condensation removal times of the other condensation removal patterns are measured, the shortest determination unit 206 redetermines the condensation removal pattern having the shortest condensation removal time among the condensation removal times of the other condensation removal patterns as the shortest pattern (FIG. 3: S111). In this case, the condensation removal time of the shortest pattern has been already updated. Thus, removing the already determined shortest pattern ensures an efficient redetermination of the shortest pattern.

In the embodiment of the disclosure, while the condensation determination unit 203 determines the occurrence of the condensation when the image reading control unit 202 executes a process of a shading correction, another configuration may be employed. For example, the condensation determination unit 203 may determine the occurrence of the condensation at a periodically specific time point such as the time point at which the condensation determination unit 203 receives an instruction from the user, which is other than at the time point of activation of the image forming apparatus 100, because the process of the shading correction is executed when the image forming apparatus 100 is activated. In this case, the condensation determination unit 203 obtains the image data corresponding to the reflected light from the white plate, for example, via the image reading control unit 202.

While the embodiment of the disclosure uses the image data corresponding to the reflected light from the white plate to determine the occurrence of the condensation, another configuration may be employed. For example, the embodiment of the disclosure may use the image data for one line of the main-scanning direction at a specific position in the image data of a typical original document. In this case, the reference pixel value for the determination of the condensation is appropriately changed.

While in the embodiment of the disclosure the condensation removal is executed after activation of the image forming apparatus 100, another configuration may be employed. For example, when the condensation determination unit 203 determines that the condensation occurs based on this image after a job is executed, and the image reading control unit 202 reads an image of an original document, the image reading control unit 202 may read the image of the original document again after the condensation removal unit 204 executes a condensation removal to remove the condensation.

While in the embodiment of the disclosure the number of condensation removal patterns are three, configurations of condensation removal patterns are appropriately changed in accordance with the number of or the kind of the condensation occurrence target portions, and the number of these condensation removal patterns are appropriately increased or decreased.

While in the embodiment of the disclosure the image forming apparatus 100 is configured to include the respective units, it may be configured that the programs, which ensure these respective units, are stored in a storage medium to be provided. This configuration causes devices to read the programs, and these devices ensure the respective units. In this case, the program itself that is read from the storage medium provides the actions and effects of the disclosure. Furthermore, it may be provided as a method for causing the steps to be executed by the respective units to be stored in a hard disk.

As described above, the image reading apparatus and the condensation removal method according to the disclosure are useful not only for a multi-functional peripheral but also for, for example, a copier and a printer, and are effective as an image reading apparatus and a condensation removal method that ensure an efficient condensation removal without an excessive cost of an apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus, comprising:
an image reading unit including
a platen,
a carriage disposed beneath the platen,
a light source included in the carriage, for irradiating documents placed on the platen,
a first mirror included in the carriage, for reflecting light from the light source exteriorly of the carriage,
a light-sensor unit located outside the carriage, for converting light reflected from the light source into document image data, and
second and third mirrors located outside the carriage, for guiding light reflected by the first mirror to the light sensor unit;
a fixing unit disposed beneath the image reading unit;
memory storing a condensation removal timetable;
a central processing unit and data storage connected by a control circuit, data in the storage configuring, via the control circuit, the central processing unit to function as
a condensation determination circuit for determining, based on luminance level of light from the light source reflected off a white plate and guided by the first, second and third mirrors to the light sensor unit, whether condensation occurs in at least one of a plurality of condensation-occurrence target areas in the image reading unit, the condensation-occurrence target areas including the carriage-internal first mirror, the carriage-external second and third mirrors, and the carriage-external light-sensor unit,
a condensation removal circuit for, when the condensation determination circuit determines condensation occurs in at least one of the condensation-occurrence target areas, executing a condensation removal process according to a first condensation removal pattern of shifting the carriage to position the first mirror over the fixing unit, and operating the fixing unit and light source to heat the first mirror, a second condensation removal pattern of shifting the carriage to position the light source close to the second and third mirrors, and operating the light source unit to heat the second and third mirrors, and a third condensation removal pattern of shifting the carriage to position the light source above the light-sensor unit, and operating the light source unit to heat the light-sensor unit, the first, second and third condensation removal patterns being stored in the condensation removal timetable, and the condensation removal circuit executing the condensation removal process until the condensation determination circuit determines, based on the luminance level of the white-plate reflected light-source light, that condensation in the at least one of the condensation-occurrence target areas is removed, and notifies the condensation removal circuit of its determination, a time measurement circuit for measuring condensation removal time taken for the condensation removal process to complete condensation removal in the at least one of the condensation-occurrence target areas, and storing the measured condensation removal time in the condensation removal timetable, in association with the condensation removal pattern according to which the completed condensation removal process was executed, and a shortest determination circuit for determining, from the condensation removal times stored in association with the condensation removal patterns in the condensation removal timetable, the condensation removal pattern having the shortest condensation removal time among the first, second and third condensation removal patterns as a shortest pattern, and causing the condensation removal circuit to execute the condensation removal process according to the shortest pattern when the condensation determination circuit determines that condensation occurs in at least one of the condensation-occurrence target areas subsequent to the shortest determination circuit having determined a shortest pattern.

2. The image reading apparatus according to claim 1, wherein:

the time measurement circuit measures the condensation removal time taken to complete the condensation removal of the shortest pattern; and the shortest determination circuit redetermines a condensation removal pattern having a shortest of the condensation removal times among the plurality of the condensation removal patterns as the shortest pattern after the condensation removal time of the shortest pattern is measured.

3. The image reading apparatus according to claim 1, wherein:

the time measurement circuit measures a condensation removal time taken to complete the condensation removal of the shortest pattern; and the shortest determination circuit determines whether the condensation removal time of the shortest pattern after the measurement is longer than a condensation removal time, determined to be a second shortest, among condensation removal times of the other condensation removal patterns other than the shortest pattern, causes a condensation removal of the other condensation removal pattern to be executed and causes the time measurement circuit to measure a condensation removal time of the other condensation removal pattern again when the condensation removal time of the shortest pattern is longer than the condensation removal time determined to be a second shortest, and redetermines a condensation removal pattern having a shortest condensation removal time among the condensation removal times of the other condensation removal patterns as the shortest pattern after all the condensation removal times of the other condensation removal patterns are measured.

4. A condensation removal method for an image reading apparatus having an image reading unit including a platen, a carriage disposed beneath the platen, a light source included in the carriage, for irradiating documents placed on the platen, a first mirror included in the carriage, for reflecting light from the light source exteriorly of the carriage, a light-sensor unit located outside the carriage, for converting light reflected from the light source into document image data, and second and third mirrors located outside the carriage, for guiding light reflected by the first mirror to the light sensor unit, a fixing unit disposed beneath the image reading unit, and memory storing a condensation removal timetable;

the method comprising:

determining, based on luminance level of light from the light source reflected off a white plate and guided by the first, second and third mirrors to the light sensor unit, whether condensation occurs in at least one of a plurality of condensation-occurrence target areas in the image reading unit, the condensation-occurrence target areas including the carriage-internal first mirror, the carriage-external second and third mirrors, and the carriage-external light-sensor unit;

when the luminance-level based determining determines condensation occurs in at least one of the condensation-occurrence target areas, executing a condensation removal process according to a first condensation removal pattern of shifting the carriage to position the first mirror over the fixing unit, and operating the fixing unit and light source to heat the first mirror, a second condensation removal pattern of shifting the carriage to position the light source close to the second and third mirrors, and operating the light source unit to heat the second and third mirrors, and a third condensation removal pattern of shifting the carriage to position the light source above the light-sensor unit, and operating the light source unit to heat the light-sensor unit, the first, second and third condensation removal patterns being stored in the condensation removal timetable, and executing the condensation removal process until the luminance-level based determining determines, based on the luminance level of the white-plate reflected light-source light, that condensation in the at least one of the condensation-occurrence target areas is removed, and reports its determination;

measuring condensation removal time taken for the condensation removal process to complete the condensation removal in the at least one of the condensation-occurrence target areas, and storing the measured condensation removal time in the condensation removal timetable, in association with the condensation removal pattern according to which the completed condensation removal process was executed; and determining from the condensation removal times stored in association with the condensation removal patterns in the condensation removal timetable, the condensation removal pattern having the shortest condensation removal time among the first, second and third condensation removal patterns as a shortest pattern, and executing the condensation removal process according to the shortest pattern when the luminance-level based determining determines that condensation occurs in at least one of the condensation-occurrence target areas subsequent to the condensation-removal-time based determining having determined a shortest pattern.

5. A non-transitory computer-readable recording medium storing a condensation removal program for controlling an image reading apparatus having

- an image reading unit including a platen, a carriage disposed beneath the platen, a light source included in the carriage, for irradiating documents placed on the platen, a first mirror included in the carriage, for reflecting light from the light source exteriorly of the carriage, a light-sensor unit located outside the carriage, for converting light reflected from the light source into document image data, and second and third mirrors located outside the carriage, for guiding light reflected by the first mirror to the light sensor unit,
- a fixing unit disposed beneath the image reading unit,
- memory storing a condensation removal timetable, and
- a central processing unit;
- the condensation removal program causing the central processing unit to function as:
- a condensation determination circuit for determining, based on luminance level of light from the light source reflected off a white plate and guided by the first, second and third mirrors to the light sensor unit, whether condensation occurs in at least one of a plurality of condensation-occurrence target areas in the image reading unit, the condensation-occurrence target areas including the carriage-internal first mirror, the carriage-external second and third mirrors, and the carriage-external light-sensor unit;
- a condensation removal circuit for, when the condensation determination circuit determines condensation occurs in at least one of the condensation-occurrence target areas, executing a condensation removal process according to a first condensation removal pattern of shifting the carriage to position the first mirror over the fixing unit, and operating the fixing unit and light source to heat the first mirror, a second condensation removal pattern of shifting the carriage to position the light source close to the second and third mirrors, and operating the light source unit to heat the second and third mirrors, and a third condensation removal pattern of shifting the carriage to position the light source above the light-sensor unit, and operating the light source unit to heat the light-sensor unit, the first, second and third condensation removal patterns being stored in the condensation removal timetable, and the condensation removal circuit executing the condensation removal process until the condensation determination circuit determines, based on the luminance level of the white-plate reflected light-source light, that condensation in the at least one of the condensation-occurrence target areas is removed, and notifies the condensation removal circuit of its determination;
- a time measurement circuit for measuring condensation removal time taken for the condensation removal process to complete condensation removal in the at least one of the condensation-occurrence target areas, and storing the measured condensation removal time in the condensation removal timetable, in association with the condensation removal pattern according to which the completed condensation removal process was executed; and
- a shortest determination circuit for determining, from the condensation removal times stored in association with the condensation removal patterns in the condensation removal timetable, the condensation removal pattern having the shortest condensation removal time among the first, second and third condensation removal patterns as a shortest pattern, and causing the condensation removal circuit to execute the condensation removal process according to the shortest pattern when the condensation determination circuit determines that condensation occurs in at least one of the condensation-occurrence target areas subsequent to the shortest determination circuit having determined a shortest pattern.

* * * * *